Patented July 25, 1933

1,919,697

UNITED STATES PATENT OFFICE

FRAZIER GROFF, OF CHARLESTON, WEST VIRGINIA, ASSIGNOR TO CARBIDE & CARBON CHEMICALS CORPORATION, A CORPORATION OF NEW YORK

IMPREGNATED PRODUCT AND PROCESS FOR MAKING THE SAME

No Drawing.  Application filed October 26, 1931. Serial No. 571,288.

The invention relates to a novel cellulosic composition containing vinyl resins, that is, resinous products resulting from the polymerization of certain vinyl compounds, and includes a process for making the new products.

Certain vinyl compounds can be polymerized to form resinous products the nature and properties of which are determined by the choice of compounds polymerized, the conditions of polymerization, and by other known factors. Various uses for these vinyl resins have been proposed including their use in combination with inert materials of a cellulosic or noncellulosic nature to form molding plastics, and their use in combination with solvents to form coating and impregnating compositions.

The usual and known methods for forming intimate mixtures of vinyl resins and cellulosic materials involve mixing the solid resin and the other material in a milling or grinding operation, and continuing this operation until a substantially uniform distribution of the ingredients in the mass has been produced. Other methods involve the addition of a solution of the resin to a mass of a cellulosic material, followed by the removal of the solvent. This leaves the mixture cemented into an agglomerated mass in which the resin is unevenly distributed. The mass must be thereafter comminuted or otherwise treated to produce a usable composition. The recovery of solvents used in forming mixtures by this method also presents difficulties.

It has been proposed to impregnate formed articles of cellulosic material with vinyl resins by saturating sheets or finished articles formed from wood, paper, cloth or the like with solutions of vinyl resins, and then eliminating the solvent used. This procedure produces articles which may or may not be thoroughly and uniformly impregnated, but the process is slow because the solvent used must be eliminated before the articles can be handled or processed further, and because the articles must be kept out of contact with each other and other articles to prevent uneven impregnation and sticking or cementing between the individual pieces.

All of the foregoing methods may be replaced by the process of the present invention which minimizes the difficulties described. The principal objects of the invention are to provide a novel and economical process for producing vinyl resin impregnated cellulosic materials and to provide a novel type of vinyl resin impregnated cellulosic products.

The invention broadly comprises forming a suspension of a cellulosic material preferably in a finely divided state, in a liquid medium by means of agitation. A finely divided vinyl resin is then introduced into the suspension. This may be done by injecting into the suspension a solution of a vinyl resin in an organic solvent which is miscible with the liquid medium, and from which solutions, the vinyl resin can be precipitated by means of this medium, or by mechanically producing a suspension of a vinyl resin, and adding it to the first suspension. The vinyl resin is incorporated in and on the cellulosic particles by means of further agitation. The solids are then separated from the liquid, dried, laid into sheets or formed as desired to produce the new products. The liquid may be then treated to recover its values by known methods. The new products of my invention are characterized by heretofore unknown properties, all as more fully hereinafter described.

The invention is not restricted to the use of any particular vinyl resins. I have found that satisfactory resins are those formed by the polymerization of two or more vinyl compounds while in mutual contact, that is, by conjoint polymerization, and that a preferred type of resin is that resulting from the conjoint polymerization of 70% or more by weight of vinyl chloride and 30% or less by weight of vinyl acetate. I prefer to use resins of the preferred type which are not more than 30% by weight soluble in cold (20° to 30° C.) toluene. Resins of this type may be formed by polymerizing the above stated proportions of vinyl chloride and vinyl acetate in the presence of a catalyst, such as benzoyl peroxide, and a liquid medium, such as paraffin hydrocarbons, aliphatic alcohols, ketones, and the like, at a temperature below about 60° C. The resin is obtained suspended in the liquid medium, and may be prepared dry by separating the liquid therefrom by decantation, and drying the resin in vacuo.

The following examples are illustrative of the invention:

I. Three parts by weight of paper pulp and about 100 parts by weight of water were placed in a paper-beater and agitated for about an hour to produce a suspension of pulp in the water. A vinyl resin resulting from the polymerization of 80 parts by weight of vinyl chloride and 20 parts by weight of vinyl acetate, and which was less than 25% by weight soluble in cold toluene was dissolved in acetone in the proportions of about 3.25 parts by weight of the resin in about 10 parts by weight in acetone. This resin solution was jetted into the suspension of pulp and it was immediately precipitated as fine fibers of the resin. The bed plate of the paper-beater was then raised against the knives and beating was continued for about 20 minutes. The pulp and resin, which was now a substantially homogeneous mixture, was then laid into a paper-like sheet.

This sheet is one form of my new products, and the vinyl resin was found to be well dispersed through the sheet. A number of the sheets were pressed together to form a laminated press board of good strength and appearance. Single sheets of the product, when hot pressed, exhibit a parchment-like appearance, and have the advantages of being water-resistant, thermoplastically workable, fire-resistant (the sheets will not support combustion), chemically and electrically inert, water-white in color, and they possess good strength and elasticity.

The paper-like material may be macerated or shredded to form molding compositions for general use. Dyes, lakes, or pigments, mold lubricants, stabilizing material, plasticizers and other ingredients may be incorporated with the resin in the solution before it is added to the pulp, or these additions may be made in the paper-beater. By means of such modifying materials it is possible to alter the physical properties of the product, and to produce various degrees of flexibility, plasticity, and color in the final product.

II. A suspension of vinyl resin in water was prepared by adding a mixture of 500 parts by weight of a vinyl resin, identical with the resin of Example I, 7 parts by weight of carnauba wax, 40 parts by weight of mineral filling material, and 17.5 parts by weight of toluidine toner which had been fluxed on hot differential rolls to produce a uniform mixture, to about 450 parts by weight of water in a ball-mill. The mixture was milled until a uniform suspension was produced.

A suspension of alpha pulp was produced by agitating 180 parts by weight of the pulp with 4500 parts by weight of water in an open tank. The suspension of resin was then added to this suspension of pulp and the agitation was continued for a short time. The resin and pulp mixture was then filtered, pressed, and dried at 100° C. The dried product was rolled for a short time on differential rolls at about 130° to 140° C., and sheeted out. This product, when ground, formed an excellent molding powder of uniform color and good strength.

It will be understood that many variations from the process as described are possible, and such modifications are included within the invention as defined by the appended claims.

I claim:

1. A process for making vinyl resin impregnated cellulosic products which comprises forming a suspension of the cellulosic material in a liquid medium by means of agitation, introducing a vinyl resin in a finely divided state into said suspension, continuing the agitation until the vinyl resin and cellulosic material are substantially uniformly dispersed throughout the suspension, separating the solid material from the liquid medium, and drying the vinyl resin impregnated cellulosic composition.

2. A process for making vinyl resin impregnated products which comprises forming a suspension of cellulosic material in a liquid medium by means of agitation, introducing in finely divided form a vinyl resin substantially identical with a resin produced by the conjoint polymerization of at least two vinyl compounds into said suspension, continuing the agitation until the vinyl resin and cellulosic material are substantially uniformly dispersed throughout the suspension, separating the dispersed solids from the liquid medium, and drying the vinyl resin impregnated cellulosic material.

3. A process for making vinyl resin impregnated products which comprises forming a suspension of cellulosic material in a liquid medium by means of agitation, introducing in finely divided form a vinyl resin substantially identical with a resin produced by the conjoint polymerization of vinyl chloride and vinyl acetate into said suspension, continuing the agitation until the vinyl resin and cellulosic material are substantially uniformly dispersed throughout the suspension, separating the dispersed solids from the liquid medium, and drying the vinyl resin impregnated cellulosic material.

4. A process for making vinyl resin impregnated cellulosic products which comprises forming a suspension of cellulosic material in a liquid medium by means of agitation, introducing a finely divided vinyl resin substantally identical with a resin produced by the conjoint polymerization of about 80 parts by weight of vinyl chloride and about 20 parts by weight of vinyl acetate and which is less than about 30% by weight soluble in toluene at 20° to 30° C. into said suspension, continuing the agitation until the vinyl resin and cellulosic material are substantially uniformly dispersed throughout the suspension, separating the dispersed solids from the liquid medium, and drying the vinyl resin impregnated cellulosic composition.

5. A process for making vinyl resin impregnated cellulosic products which comprises forming a suspension of cellulosic material in an aqueous medium by means of agitation, injecting a solution of vinyl resin, from which the vinyl resin can be precipitated by means of water, into said suspension, continuing the agitation until the vinyl resin and cellulosic material are substantially uniformly dispersed throughout the suspension, separating the vinyl resin impregnated cellulosic material from the liquid, and drying the separated material.

6. A process for making vinyl resin impregnated cellulosic products which comprises forming a suspension of cellulosic material in an aqueous medium by means of agitation, injecting a solution of a vinyl resin substantially identical with a resin produced by the conjoint polymerization of at least two different vinyl compounds and from which the vinyl resin can be precipitated by means of water, into said suspension, continuing the agitation until the vinyl resin and cellulosic material are substantially uniformly dispersed throughout the suspension, separating the vinyl resin impregnated cellulosic material from the liquid, and drying the separated material.

7. A process for making vinyl resin impregnated cellulosic products which comprises forming a suspension of cellulosic material in an aqueous medium by means of agitation, injecting a solution of a vinyl resin in acetone into said suspension, continuing the agitation until the vinyl resin and cellulosic material are substantially uniformly dispersed throughout the suspension, separating the vinyl resin impregnated cellulosic material from the liquids, and drying said separated material.

8. A process for making vinyl resin impregnated cellulosic products which comprises forming a suspension of cellulosic material in an aqueous medium by means of agitation, injecting a solution in acetone of a vinyl resin substantially identical with a resin produced by the conjoint polymerization of at least two different vinyl compounds into said suspension, continuing the agitation until the vinyl resin and cellulosic material are substantially uniformly dispersed throughout the suspension, separating the vinyl resin impregnated cellulosic material from the liquids, and drying said separated material.

9. A process for making vinyl resin impregnated cellulosic products which comprises forming a suspension of cellulosic material in an aqueous medium by means of agitation, forming a solution of vinyl resin substantially identical with a vinyl resin resulting from the conjoint polymerization of about 80 parts by weight of vinyl chloride and about 20 parts by weight of vinyl acetate and which is less than about 30% by weight soluble in toluene at 20° to 30° C. from which solution the vinyl resin can be precipitated by means of water, injecting said solution into said suspension, continuing the agitation until the vinyl resin and cellulosic material are substantially uniformly dispersed through the suspension, separating the vinyl resin impregnated cellulosic material from the liquid, and drying the separated material.

10. A process for making vinyl resin impregnated cellulosic products which comprises forming a suspension of cellulosic material in an aqueous medium by means of agitation, injecting an acetone solution of a vinyl resin substantially identical with a vinyl resin resulting from the conjoint polymerization of about 80 parts by weight of vinyl chloride and about 20 parts by weight of vinyl acetate and which is less than about 30% by weight soluble in toluene at 20° to 30° C. into said suspension, continuing the agitation until the vinyl resin and cellulosic material are substantially uniformly dispersed throughout the suspension, separating the vinyl resin impregnated cellulosic material from the liquids, and drying said separated material.

11. A process for making vinyl resin impregnated cellulosic products which comprises forming and agitating a suspension of about 3 parts by weight of cellulosic material in about 100 parts by weight of water in a paper-beater, injecting a solution of about 3.0 to 3.5 parts by weight of a vinyl resin in about 10 parts by weight of acetone into said suspension, increasing and continuing the agitation in the paper-beater until the vinyl resin and cellulosic material are substantially uniformly dispersed throughout the suspension, and laying the vinyl resin impregnated cellulosic material into paper-like sheets.

12. A cellulosic product the fibers of which are impregnated substantially uniformly throughout with a vinyl resin and which is thermo-plastically workable, water-resistant, chemically and electrically inert, and which will not support combustion.

13. A cellulosic product the fibers of which are impregnated substantially uniformly throughout with a vinyl resin and which is thermo-plastically workable, water-resistant, chemically and electrically inert, and which will not support combustion, said vinyl resin being substantially identical with a resin produced by the conjoint polymerization of at least two different vinyl compounds.

14. A cellulosic product the fibers of which are impregnated with a vinyl resin substantially identical with a vinyl resin resulting from the conjoint polymerization of about 80 parts by weight of vinyl chloride and about 20 parts by weight of vinyl acetate and which is less than about 30% by weight soluble in toluene at 20° to 30° C., said product being water-resistant, thermo-plastically workable, chemically and electrically inert, and incapable of supporting combustion.

15. A cellulosic product the fibers of which are impregnated substantially uniformly throughout with a vinyl resin and which is thermo-plastically workable, water-resistant, chemically and electrically inert, and which will not support combustion, said vinyl resin being substantially identical with a resin produced by the conjoint polymerization of vinyl chloride and vinyl acetate.

16. A parchment-like sheet comprising a sheet of cellulosic material the fibers of which are impregnated with a vinyl resin and which has been subjected to a thermo-pressing operation.

17. A parchment-like sheet comprising a sheet of cellulosic material the fibers of which are impregnated with a vinyl resin substantially identical with a vinyl resin resulting from the conjoint polymerization of about 80 parts by weight of vinyl chloride and about 20 parts by weight of vinyl acetate and which is less than about 30% by weight soluble in toluene at 20° to 30° C. and which has been subjected to a thermo-pressing operation.

FRAZIER GROFF.